Dec. 9, 1924.

W. G. PERKS 1,518,351

APPARATUS FOR HATCHING THE EGGS OF BIRDS

Filed March 2, 1923  2 Sheets-Sheet 1

INVENTOR:
Walter George Perks.
by Arthur J. Stephens
Attorney.

Dec. 9, 1924.  1,518,351
W. G. PERKS
APPARATUS FOR HATCHING THE EGGS OF BIRDS
Filed March 2, 1923   2 Sheets-Sheet 2

INVENTOR:
Walter George Perks.
by Arthur J. Stephens
Attorney.

Patented Dec. 9, 1924.

1,518,351

UNITED STATES PATENT OFFICE.

WALTER GEORGE PERKS, OF ROMSEY, ENGLAND.

APPARATUS FOR HATCHING THE EGGS OF BIRDS.

Application filed March 2, 1923. Serial No. 622,344.

*To all whom it may concern:*

Be it known that I, WALTER GEORGE PERKS, a subject of the King of Great Britain and Ireland, residing at Scrag Hill, Romsey, Hampshire, England, have invented a new and useful Improved Apparatus for Hatching the Eggs of Birds, on which Letters Patent have been obtained in Great Britain No. 187,913, dated 16th March, 1922, of which the following is a specification.

The present invention relates to improvements in incubators for the eggs of birds.

The apparatus comprises a box-like framework 1 standing on legs 2.

Figures 1, 2:
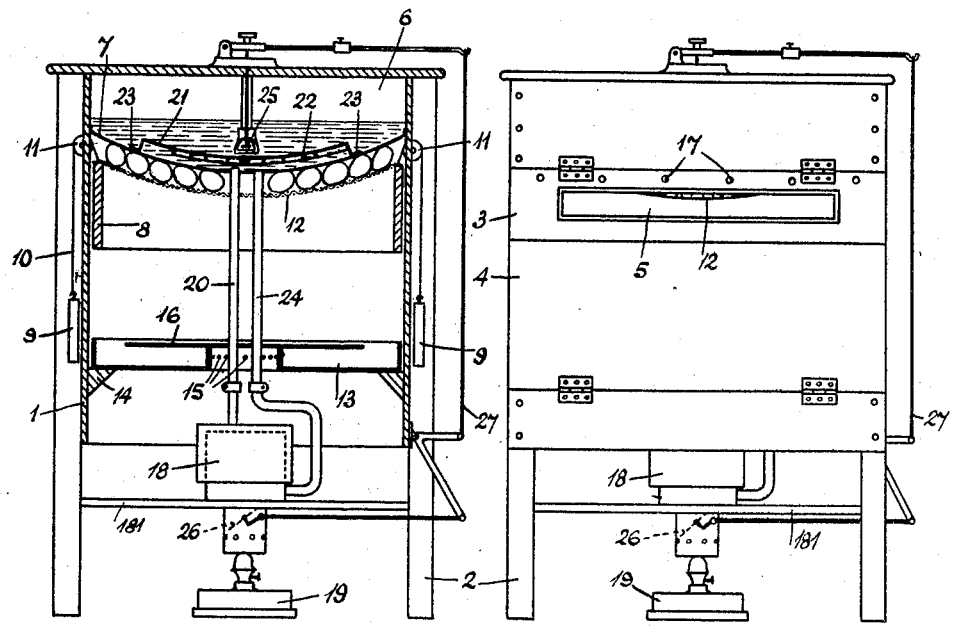
Figure 1 shows a sectional elevation of the complete apparatus.
Figure 2 shows an outside view of Figure 1.
Figure 3:
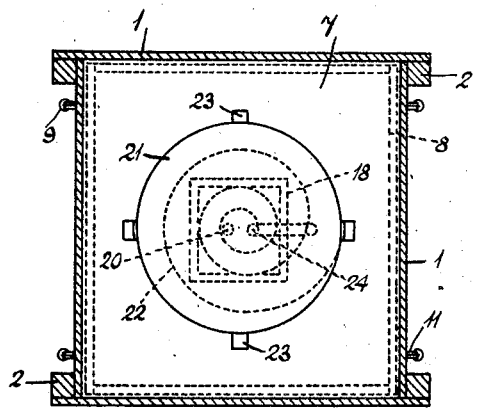
Figure 3 shows a sectional plan view of Figure 1.
Figure 4:
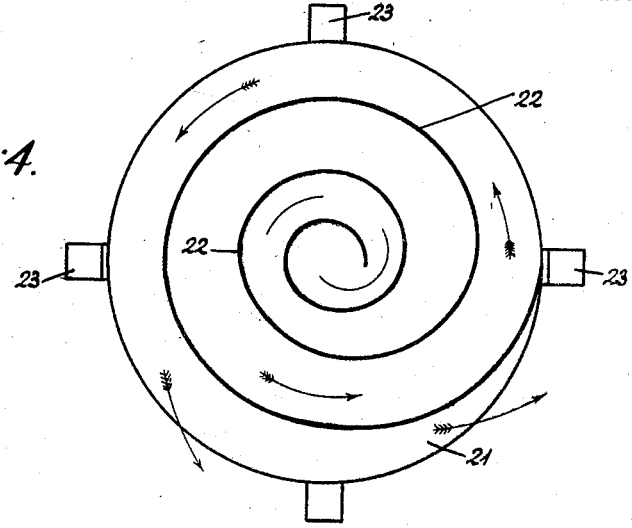
Figure 4 shows a plan view of the water baffle plates.
Figure 5:
Figure 5 shows a sectional elevation of Figure 4.
Figure 6:
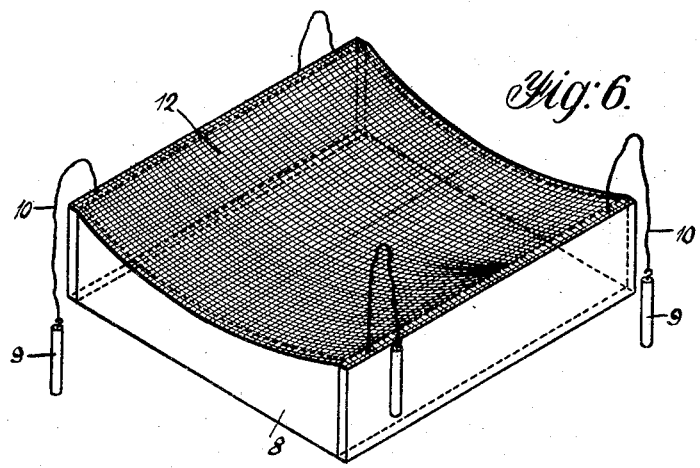
Figure 6 shows a perspective view of the egg drawer.

As shown in Figure 2, the front wall of the framework is formed into two hinged flaps 3 and 4, the flap 3 having a window 5 therein. The upper part of the framework 1 is formed into a water chamber 6 by means of the flexible bottom 7 of any suitable waterproof material, as for example rubber coated canvas. An egg drawer or tray 8 is provided vertically slidable within the framework 1, its weight being balanced by weights 9 in conjunction with cords 10 passing over pulleys 11 carried by the framework 1. The top of the drawer 8 is covered with some flexible porous material 12, such as canvas or wire cloth, and is shaped so as to conform to the flexible bottom 7 of the water chamber 6. Below the egg drawer 8 is a moisture tray 13 carried on supports 14. The tray 13 contains water, moist earth, or similar substance, and is provided with holes 15 for the entry of air and a baffle plate 16 to deflect the air over the surface of the moist substance. The air being thus moistened rises, passes through the flexible porous top 12 of the egg drawer 8 and after circulating among the eggs passes out of the apparatus through holes 17 provided in the hinged flap 3. The water in the chamber 6 is warmed by means of a boiler 18 suspended in the framework 1 by a cross-piece 181, and heated by a lamp 19. The hot water rises through a pipe 20 which passes a short way through the flexible bottom 7 of the water chamber 6 and is distributed through the chamber by means of a baffle plate 21 having a spiral channel formed beneath it by a strip 22. The baffle plate 21 rests on the flexible bottom 7 by means of four feet 23, and is preferably slightly curved to correspond to the shape of the flexible bottom 7. The arrows in Figure 4 indicate the passage of the water through the baffle plate. The cold water descends to the boiler 18 through a pipe 24. The upper parts of the pipes 20 and 24 are preferably of flexible material such as rubber, and suitable holes are made for their passage through the baffle plate 16 and the flexible top 12 of the egg drawer 8. A thermostat device is provided for maintaining constant the temperature of the water in the chamber 6. This may comprise the well known expansible capsule 25 working on a pivoted flap 26 in the chimney of the lamp 19, through a rod and lever system 27.

In use, the water is allowed to reach the proper temperature, the hinged flaps 3 and 4 are opened, the drawer 8 lowered and the eggs placed in position. The drawer 8 is raised to bring the eggs in contact with the flexible bottom 7 of the water chamber 6 and the flaps 3 and 4 closed. At the hatching period, the drawer 8 is lowered slightly to the level of the window and when hatched the chicks may be removed by opening the flap 4.

It will be clearly understood that I may make considerable variation in the framework and position of the parts of the apparatus, without departing from the scope and spirit of my invention.

What I claim is:—

1. An incubator for the eggs of birds, comprising a box-like framework, a liquid chamber having a flexible liquid-tight bottom in the upper part of said framework, means for circulating hot liquid in said chamber, means for maintaining said liquid at a proper steady temperature, and a porous flexible egg support carried on a drawer automatically slidable within said framework when pressed downwards, said flexible support being shaped conformably to said flexible liquid-tight bottom of said liquid chamber.

2. An incubator for the eggs of birds, comprising a box-like framework, a liquid chamber having a flexible liquid-tight bottom in upper part of said framework, means for circulating hot liquid in said chamber, means for maintaining said liquid at a proper steady temperature, a porous flexible egg support carried on a drawer automatically slidable within said framework, when pressed downwards, said flexible support being shaped conformably to said flexible liquid-tight bottom of said liquid chamber and means for balancing said egg support.

3. An incubator for the eggs of birds, comprising a box-like framework, a liquid chamber having a flexible liquid-tight bottom in the upper part of said framework, means for circulating hot liquid in said chamber, means for maintaining said liquid at a proper steady temperature, a porous flexible egg support carried on a drawer vertically slidable within said framework, said flexible egg support being shaped conformably to said flexible liquid-tight bottom of said liquid chamber, pulleys rotatably mounted in said framework, cords attached to said drawer and running over said pulleys, weights attached to said cords and adapted to balance said drawer, and a moisture tray carried below said drawer in said framework.

4. An incubator for the eggs of birds comprising a box-like framework, two flaps hinged to the front thereof, a window in one of said flaps, a liquid chamber having a flexible liquid-tight bottom in the upper part of said framework, means for circulating hot liquid in said chamber, means for maintaining said liquid at a proper steady temperature, a porous flexible egg support carried on a drawer vertically slidable within said framework, said flexible egg support being shaped conformably to said flexible liquid-tight bottom of said liquid chamber, pulleys rotatably mounted in said framework, cords attached to said drawer and running over said pulleys, weights attached to said cords and adapted to balance said drawer, and a moisture tray carried below said drawer in said framework.

5. An incubator for the eggs of birds, comprising a box-like framework, two flaps hinged to the front thereof, the upper flap having a window and ventilation holes therein, a liquid chamber having a flexible liquid-tight bottom in the upper part of said framework, means for circulating hot liquid in said chamber, means for maintaining said liquid at a proper steady temperature, a porous flexible egg support carried on a drawer vertically slidable within said framework, said flexible egg support being shaped conformably to said flexible liquid-tight bottom of said liquid chamber, pulleys rotatably mounted in said framework, cords attached to said drawer and running over said pulleys, weights attached to said cords and adapted to balance said drawer, and a moisture tray having air inlet holes and an air baffle plate therein carried below said drawer in said framework.

6. An incubator for the eggs of birds, comprising a box-like framework, two flaps hinged to the front thereof, the upper flap having a window and ventilating holes therein, a liquid chamber having a flexible liquid-tight bottom in the upper part of said framework, a liquid boiler suspended in the lower part of said framework, a lamp standing beneath said boiler, flow and return pipes connecting said fluid chamber with said heater, means for maintaining liquid in said liquid chamber at a proper steady temperature, a porous flexible egg support carried on a drawer vertically slidable within said framework, said flexible egg support being shaped conformably to said flexible liquid-tight bottom of said liquid chamber, pulleys rotatably mounted in said framework, cords attached to said drawer and running over said pulleys, weights attached to said cords and adapted to balance said drawer, and a moisture tray having air inlet holes and an air baffle plate therein carried below said drawer in said framework.

7. An incubator for the eggs of birds, comprising a box-like framework, two flaps hinged to the front thereof, the upper flap having a window and ventilation holes therein, a liquid chamber having a flexible liquid-tight bottom in the upper part of said framework, a liquid boiler suspended in the lower part of said framework, a lamp standing beneath said boiler, a flow pipe in part flexible connecting the upper part of said boiler with said liquid chamber, a baffle plate having a spiral passage thereunder standing on said flexible bottom of said liquid chamber, a return pipe in part flexible connecting said liquid chamber with the lower part of said boiler, means for maintaining liquid in said liquid chamber at a proper steady temperature, a porous flexible egg support carried on a drawer vertically slidable within said framework, said flexible egg support being shaped conformably to said flexible liquid-tight bottom of said liquid chamber, pulleys rotatably mounted in said framework, cords attached to said drawer and running over said pulleys, weights attached to said cords and adapted to balance said drawer, and a moisture tray having air inlet holes and an air baffle plate therein carried below said drawer in said framework.

8. An incubator for the eggs of birds, comprising a box-like framework, two flaps hinged to the front thereof, the upper flap having a window and ventilation holes therein, a liquid chamber having a flexible liquid-tight bottom in the upper part of said framework, a liquid boiler suspended in the lower part of said framework, a lamp standing beneath said boiler, a flow pipe in part flexible connecting the upper part of said boiler with said liquid chamber, a baffle plate having a spiral passage thereunder standing on said flexible bottom of said liquid chamber, a return pipe in part flexible connecting said liquid chamber with the lower part of said boiler, an expansible capsule in said water chamber, a pivoted damper flap in chimney of said lamp, a system of rods and levers connecting said expansible capsule with said damper flap, a porous flexible egg support carried on a drawer vertically slidable within said framework, said flexible egg support being shaped conformably to said flexible liquid-tight bottom of said liquid chamber, pulleys rotatably mounted in said framework, cords attached to said drawer and running over said pulleys, weights attached to said cords and adapted to balance said drawer, and a moisture tray having air inlet holes and an air baffle plate therein carried below said drawer in said framework.

In testimony whereof I have signed my name to this specification.

WALTER GEORGE PERKS.